US010369528B2

(12) United States Patent
Onozuka et al.

(10) Patent No.: US 10,369,528 B2
(45) Date of Patent: Aug. 6, 2019

(54) POROUS SUPPORT-ZEOLITE MEMBRANE COMPOSITE, AND METHOD FOR PRODUCING POROUS SUPPORT-ZEOLITE MEMBRANE COMPOSITE

(71) Applicant: Mitsubishi Chemical Corporation, Chiyoda-ku (JP)

(72) Inventors: Ayuko Onozuka, Kanagawa (JP); Miki Yamada, Kanagawa (JP); Mikio Hayashi, Kanagawa (JP); Takahiko Takewaki, Kanagawa (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/602,453

(22) Filed: May 23, 2017

(65) Prior Publication Data
US 2017/0259214 A1    Sep. 14, 2017

Related U.S. Application Data

(63) Continuation of application No. PCT/JP2015/083069, filed on Nov. 25, 2015.

(30) Foreign Application Priority Data

Nov. 25, 2014 (JP) ................................. 2014-237841

(51) Int. Cl.
| B01D 53/22 | (2006.01) |
| B01D 67/00 | (2006.01) |
| B01D 69/10 | (2006.01) |
| B01D 69/12 | (2006.01) |
| B01D 71/02 | (2006.01) |
| C01B 39/02 | (2006.01) |
| C01B 39/38 | (2006.01) |
| C01B 39/46 | (2006.01) |
| C01B 39/48 | (2006.01) |

(52) U.S. Cl.
CPC .......... B01D 69/12 (2013.01); B01D 53/228 (2013.01); B01D 67/0051 (2013.01); B01D 69/10 (2013.01); B01D 71/028 (2013.01); C01B 39/02 (2013.01); C01B 39/38 (2013.01); C01B 39/46 (2013.01); C01B 39/48 (2013.01); B01D 2325/02 (2013.01); C01P 2004/03 (2013.01)

(58) Field of Classification Search
CPC .. B01D 53/228; B01D 67/0051; B01D 69/10; B01D 69/105; B01D 69/12; B01D 71/028; C01B 39/46
See application file for complete search history.

(56) References Cited

U.S. PATENT DOCUMENTS

| 5,554,286 A | 9/1996 | Okamoto et al. | |
| 2002/0114958 A1 | 8/2002 | Ozeki et al. | |
| 2003/0104925 A1* | 6/2003 | Lai ........................ | B01D 71/028 502/4 |
| 2004/0173094 A1 | 9/2004 | Nakayama et al. | |
| 2005/0067344 A1* | 3/2005 | Tanaka .................. | B01D 71/028 210/490 |
| 2005/0229779 A1 | 10/2005 | Nakayama et al. | |
| 2007/0045174 A1* | 3/2007 | Yeung .................. | B01D 53/228 210/500.21 |
| 2008/0160189 A1* | 7/2008 | Mitra .................... | B01D 71/028 427/201 |
| 2009/0000475 A1* | 1/2009 | Fekety .................. | B01D 53/228 95/105 |
| 2011/0160039 A1 | 6/2011 | Himeno et al. | |
| 2012/0009120 A1 | 1/2012 | Cho et al. | |
| 2012/0024777 A1 | 2/2012 | Sugita et al. | |
| 2014/0241981 A1* | 8/2014 | Dutta .................... | B01D 71/028 423/709 |
| 2015/0265975 A1* | 9/2015 | Liu ....................... | B01D 71/028 96/11 |
| 2017/0189862 A1* | 7/2017 | Imasaka ............... | B01D 71/028 |

FOREIGN PATENT DOCUMENTS

| EP | 2 402 071 A1 | 1/2012 |
| JP | 7-185275 | 7/1995 |
| JP | 2000-237561 | 9/2000 |
| JP | 3128517 B2 | 1/2001 |
| JP | 2002-249313 | 9/2002 |

(Continued)

OTHER PUBLICATIONS

Hasegawa, Y. et al., "Preparation of novel chabazite (CHA)-type zeolite layer on porous alpha-Al2O3 tube using template-free solution", Journal of Membrane Science, 347, 2010, pp. 193-196. (Year: 2010).*

(Continued)

Primary Examiner — Jason M Greene
(74) Attorney, Agent, or Firm — Oblon, McClelland, Maier & Neustadt, L.L.P.

(57) ABSTRACT

An object of the present invention is to provide a porous support-zeolite membrane composite ensuring that at the time of separation or concentration with a zeolite membrane, both sufficient throughput and high separation performance are achieved in practice and the present invention relates to a porous support-zeolite membrane composite having a porous support and a zeolite membrane formed on the porous support, wherein part of the zeolite membrane penetrates into the inside of the porous support and the distance from the surface of the porous support to the inside into which the zeolite film penetrates is 5.0 μm or less on average.

7 Claims, 3 Drawing Sheets

(56) References Cited

FOREIGN PATENT DOCUMENTS

| | | | | |
|---|---|---|---|---|
| JP | 2003-144871 | 5/2003 | | |
| JP | 2004-66188 | 3/2004 | | |
| JP | 2004-105942 | 4/2004 | | |
| JP | 2005-125313 A | 5/2005 | | |
| JP | 2005-262189 | 9/2005 | | |
| JP | 2008-18387 | 1/2008 | | |
| JP | 2008-253931 | 10/2008 | | |
| JP | 2010-51894 A | 3/2010 | | |
| JP | 2012-45483 | 3/2012 | | |
| JP | 2014-50840 | 3/2014 | | |
| WO | WO 2006/046850 A1 * | 5/2006 | ............ | B01D 71/02 |
| WO | WO 2012/046545 A1 | 4/2012 | | |

OTHER PUBLICATIONS

International Search Report dated Feb. 9, 2016 in PCT/JP2015/083069, filed on Nov. 25, 2015 (with English Translation).

Written Opinion dated Feb. 9, 2016 in PCT/JP2015/083069, filed on Nov. 25, 2015.

Shiguang Li et al "Improved SAPO-34 Membranes for $CO_2/CH_4$ Separations", Adv. Mater., 2006, 18, pp. 3.

Halil Kalipcilar et al., "Synthesis and Separation Performance of SSZ-13 Zeolite Membranes on Tubular Supports", Chem. Mater., 2002, 14, pp. 7.

The Partial Supplementary European Search Report dated Aug. 22, 2017 in Patent Application No. 15863411.3.

Y. Hasegawa, et al., "Preparation of Novel Chabazite (CHA)-Type Zeolite Layer on Porous $\alpha\text{-}Al_2O_3$ Tube using Template-Free Solution" Journal of Membrane Science, vol. 347, No. 1-2, XP026796039, Oct. 22, 2009, pp. 193-196.

Extended European Search Report dated Dec. 6, 2017 in Patent Application No. 15863411.3, 28 pages.

Guolin Shao, et al. "The investigation of preparing the beta zeolite membrane by the way of secondary growth", Advanced Materials Research, vol. 608-609, 2012, pp. 1463-1466.

* cited by examiner

POROUS SUPPORT-ZEOLITE MEMBRANE COMPOSITE, AND METHOD FOR PRODUCING POROUS SUPPORT-ZEOLITE MEMBRANE COMPOSITE

TECHNICAL FIELD

The present invention relates to a porous support-zeolite membrane composite and specifically relates to a porous support-zeolite membrane composite having good separation performance and a production method thereof. The present invention also relates to a method for separating or concentrating a gas or liquid mixture by using the porous support-zeolite membrane composite.

BACKGROUND ART

Conventionally, separation or concentration of a gas or liquid mixture containing an organic compound and an inorganic compound is performed by distillation, azeotropic distillation, solvent extraction/distillation, freeze concentration separation, adsorption, absorption, cryogenic separation and other methods according to the properties of the target substance. However, these methods are disadvantageous in that a lot of energy is required or the range of application to the target for separation or concentration is limitative.

Recently, as a separation method substituting for these methods, a membrane separation/concentration method using a membrane such as polymer membrane or zeolite membrane has been proposed. The polymer membrane, for example, a flat membrane or a hollow fiber membrane, is excellent in processability but has a drawback of low heat resistance. In addition, many of polymer membranes are low in the chemical resistance and swell when contacted particularly with an organic compound such as organic solvent or organic acid, and the range of application to the target for separation or concentration is limitative.

The zeolite membrane is usually used for separation or concentration as a zeolite membrane composite obtained by membranous formation of zeolite on a support. For example, a mixture of an organic compound and water is put into contact with the zeolite membrane composite to selectively allow permeation of water, whereby the organic compound can be separated or concentrated. Compared with distillation or separation using an adsorbent, in the separation and concentration using a zeolite membrane, the amount of energy used can be reduced and in addition, because of an inorganic material, the separation or concentration can be conducted in a wider temperature range than that with a polymer membrane. Furthermore, the membrane can be applied also to separation of a mixture containing an organic compound.

As the separation method using a zeolite membrane, in the case of liquid separation, for example, a method of concentrating an alcohol by selectively allowing permeation of water by use of an A-type zeolite membrane composite (Patent Document 1), a method of concentrating an alcohol by selectively allowing permeation of water from a mixed system of an alcohol and water by use of a mordenite-type zeolite membrane composite (Patent Document 2), and a method of separating/concentrating acetic acid by selectively allowing permeation of water from a mixed system of acetic acid and water by use of a ferrierite-type zeolite membrane composite (Patent Document 3) have been proposed.

Examples of the gas separation include separation between carbon dioxide and nitrogen discharged from thermal power plants, petrochemical industries, etc., and separation between hydrogen and hydrocarbon, between hydrogen and oxygen, between hydrogen and carbon dioxide, between nitrogen and oxygen, and between paraffin and olefin. As the zeolite membrane usable for gas separation, zeolite membranes such as A-type membrane, an FAU membrane, an MFI membrane, a SAPO-34 membrane and DDR membrane are known.

In a natural gas purification plant or a plant for biogas generation through methane fermentation of garbage, etc., separation between carbon dioxide and methane is demanded and as the zeolite membrane enabling successful separation therebetween, DDR (Patent Document 4), SAPO-34 (Non-Patent Document 1) and SSZ-13 (Non-Patent Document 2), each utilizing the molecular sieve function of zeolite, are known as a high-performance membrane.

PRIOR ART LITERATURE

Patent Document

Patent Document 1: JP-A-7-185275
Patent Document 2: JP-A-2003-144871
Patent Document 3: JP-A-2000-237561
Patent Document 4: JP-A-2004-105942

Non-Patent Document

Non-Patent Document 1: Shiguang Li et al., "Improved SAPO-34 Membranes for CO2/CH4 Separation", Adv. Mater., 2006, 18, 2601-2603
Non-Patent Document 2: Halil Kalipcilar et al., "Synthesis and Separation Performance of SSZ-13 Zeolite Membranes on Tubular Supports", Chem. Mater., 2002, 14, 3458-3464

SUMMARY OF THE INVENTION

Problems that the Invention is to Solve

Although the zeolite membrane is very useful as the separation technology, since the cost per unit area is generally high in comparison with a polymer membrane, a higher permeation performance than the current membranes is required for practical applications. Increase in the permeation amount per unit volume makes it possible to reduce the required membrane area, leading to compact apparatus design and cost reduction. On the other hand, if the separation performance can be further enhanced, the loss of the target for separation can be decreased, and therefore, enhancement of the separation performance is desired at the same time.

An object of the present invention is to provide a porous support-zeolite membrane composite and a production method thereof, ensuring that the conventional problems are solved and at the time of separation or concentration with a zeolite membrane, both sufficient throughput and high separation performance are achieved in practice.

Means for Solving the Problems

As a result of many intensive studies to attain the object above, the present inventors have found that when the amount of zeolite penetrating into pores of a porous support is controlled to a specific range, the permeation performance or separation performance of a zeolite membrane is enhanced. The present invention has been accomplished based on this finding.

Namely, the gist of the present invention resides in the followings.

[1] A porous support-zeolite membrane composite having a porous support and a zeolite membrane formed on the porous support, wherein:
part of the zeolite membrane penetrates into the inside of the porous support, and
the distance from the surface of the porous support to the inside into which the zeolite film penetrates is 5.0 μm or less on average.

[2] A porous support-zeolite membrane composite having a porous support and a zeolite membrane formed on the porous support, wherein:
in an SEM image obtained by observing the zeolite membrane from the cross-section, the area proportion of voids present in the zeolite membrane is 0.3% or more relative to the zeolite membrane.

[3] The porous support-zeolite membrane composite according to the above [1], wherein in an SEM image obtained by observing the zeolite membrane from the cross-section, the area proportion of voids present in the zeolite membrane is 0.3% or more relative to the zeolite membrane.

[4] The porous support-zeolite membrane composite according to any one of the above [1] to [3], wherein the $SiO_2/Al_2O_3$ molar ratio of the zeolite membrane is 2,000 or less.

[5] The porous support-zeolite membrane composite according to any one of the above [1] to [4], wherein the $SiO_2/Al_2O_3$ molar ratio of the zeolite membrane is 20 or more.

[6] The porous support-zeolite membrane composite according to any one of the above [1] to [5], wherein the average pore size of the porous support is 0.3 μm or more.

[7] The porous support-zeolite membrane composite according to any one of the above [1] to [6], wherein the pore structure of zeolite constituting the zeolite membrane is CHA or MFI.

[8] The porous support-zeolite membrane composite according to any one of the above [1] to [7], which is used for separation of a gas mixture.

[9] A separation or concentration method of a gas or liquid mixture, comprising bringing a gas or liquid mixture composed of a plurality of components into contact with the porous support-zeolite membrane composite according to any one of the above [1] to [7] to separate by permeation a high-permeability component from the mixture or concentrate a low-permeability component by permeation and separation of a high-permeability component.

[10] A production method of a porous support-zeolite membrane composite having a porous support and a zeolite membrane formed on the porous support, comprising
forming the zeolite membrane on the porous support having attached thereto an inorganic particle except for zeolite.

[11] The production method of a porous support-zeolite membrane composite according to the above [10], wherein from 0.1 to 15 g of the inorganic particle is attached onto 1 m² of the porous support.

[12] A production method of a porous support-zeolite membrane composite having a porous support and a zeolite membrane formed on the porous support, comprising forming the zeolite membrane after attaching a seed crystal onto the porous support, wherein
the ratio represented by (average particle size of seed crystal)/(average pore size of porous support) is from 0.3 to 10.

[13] The production method of a porous support-zeolite membrane composite according to the above [12], wherein the average pore size of the porous support is 0.3 μm or more.

Effect of the Invention

According to the present invention, a porous support-zeolite membrane composite, ensuring that at the time of separation or concentration with a zeolite membrane, both sufficient throughput and high separation performance are achieved in practice, can be provided.

In particular, the permeance of carbon dioxide or hydrogen is high in the separation of a gas mixture, and a high separation coefficient can be obtained in the separation between, for example, carbon dioxide and methane.

MODE FOR CARRYING OUT THE INVENTION

Figure 1:
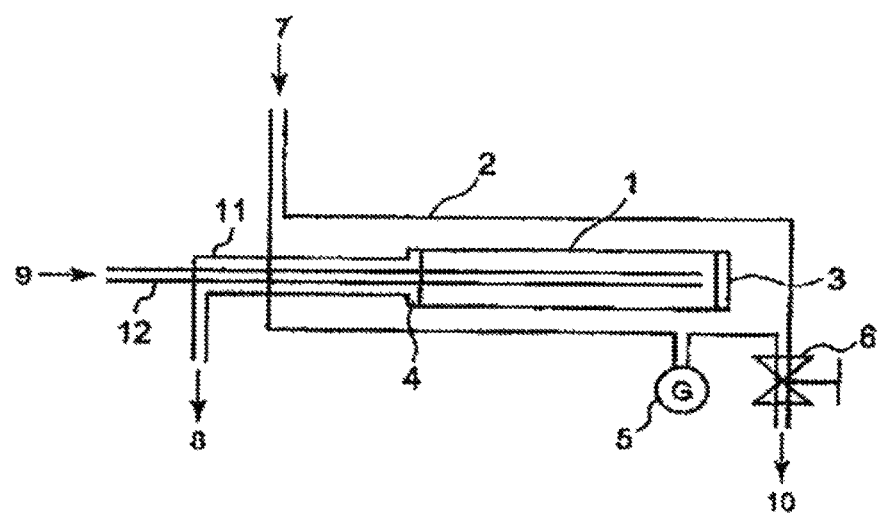
FIG. 1 is a schematic diagram of the measuring apparatus used for gas separation.

Although the mode for carrying out the present invention is described in detail below, the following description of constitutional requirements is one example of the embodiment of the present invention, and the present invention is not limited to these contents and can be conducted by making various modifications within the scope of the gist thereof.

In the description of the present invention, "% by mass" has the same meaning as "wt %". In addition, "to" indicating the numerical value range is used to include the numerical values described before and after it as the lower limit value and the upper limit value, respectively.

The porous support-zeolite membrane composite of the present invention is a porous support-zeolite membrane composite having a porous support and a zeolite membrane formed on the porous support, wherein part of the zeolite membrane penetrates into the inside of the porous support and the distance from the surface of the porous support to the inside into which the zeolite film penetrates is 5.0 μm or less on average. Here, in an SEM image obtained by observing the zeolite membrane from the cross-section, the area proportion of voids present in the zeolite membrane is 0.3% or more relative to the zeolite membrane.

In addition, the porous support-zeolite membrane composite of the present invention is a porous support-zeolite membrane composite having a porous support and a zeolite membrane formed on the porous support, wherein in an SEM image obtained by observing the zeolite membrane from the cross-section, the area proportion of voids present in the zeolite membrane is 0.3% or more relative to the zeolite membrane.

<Porous Support>

First, the porous support (hereinafter, sometimes simply referred to as "support") is described below.

In the present invention, the porous support may be any as long as it is a support having sufficient chemical stability to enable membranous crystallization of zeolite on the surface and being composed of a porous material. Usually, an inorganic porous support is preferred, and examples thereof include silica, alumina such as α-alumina and γ-alumina, mullite, zirconia, titania, yttria, a ceramic sintered body (ceramic support) such as silicon nitride and silicon carbide, a sintered metal such as iron, bronze and stainless steel, glass, and a carbon molding.

Among these porous supports, an inorganic porous support (ceramic support) containing a material obtained by sintering a ceramic that is a solid material with the basic component or a majority thereof being composed of an inorganic nonmetallic substance is preferred. Use of an inorganic porous support is expected to produce an effect of increasing the adhesion by its bonding with zeolite.

Specifically, for example, a ceramic sintered body (ceramic support) containing silica, alumina such as α-alumina and γ-alumina, mullite, zirconia, titania, yttria, silicon nitride, silicon carbide, etc. is preferred. Among these, an inorganic porous support containing at least one of alumina, silica and mullite is more preferred, and an inorganic porous support composed of alumina or mullite is still more preferred. When such a support is used, partial zeolitization is facilitated, and binding between support and zeolite is therefore strengthened, as a result, a dense membrane having high separation performance is readily formed.

The shape of the porous support is not particularly limited as long as a gas mixture or a liquid mixture can be effectively separated, and the shape specifically includes, for example, a plate, a tube, a cylinder, a honeycomb having many columnar or prismatic holes present therein, and a monolith, with a tubular (particularly, cylindrically tubular) shape being preferred.

In the present invention, zeolite is formed like a membrane on such a porous support, i.e., on a surface, etc. of the support. The surface of the support may be any surface according to the shape of the support and may be even a plurality of faces. For example, in the case of a cylindrically tubular support, the surface may be either the outer-side surface or the inner-side surface and depending on the case, may be both outer-side and inner-side surfaces.

Although the average pore size of the porous support is not particularly limited, the pore size is preferably controlled. The average pore size of the support is usually 0.02 µm or more, preferably 0.05 µm or more, more preferably 0.1 µm or more, still more preferably 0.3 µm or more, yet still more preferably 0.5 µm or more, most preferably 0.7 µm or more, and is usually 20 µm or less, preferably 10 µm or less, more preferably 5 µm or less, still more preferably 2 µm or less, yet still more preferably 1.5 µm or less, most preferably 1 µm or less. When the average pore size is not less than the lower limit, the permeation amount tends to increase, whereas when it is not more than the upper limit, there is little problem with the strength of the support itself, or a dense zeolite membrane tends to be readily formed.

The average pore size of the porous support is a value measured by a mercury intrusion method.

The average thickness (wall thickness) of the porous support is usually 0.1 mm or more, preferably 0.3 mm or more, more preferably 0.5 mm or more, and is usually 7 mm or less, preferably 5 mm or less, more preferably 3 mm or less. The support is used with the purpose of imparting mechanical strength to the zeolite membrane, and when the average thickness of the support is more than the lower limit, it is likely that the porous support-zeolite membrane composite has sufficient strength and the porous support-zeolite membrane composite is resistant to impact, vibration, etc. When the average thickness of the support is not more than the upper limit, the permeated substance tends to successfully diffuse, resulting in a high permeation rate.

The average thickness (wall thickness) of the porous support is a value measured by a caliper.

The porosity of the porous support is usually 20% or more, preferably 25% or more, more preferably 30% or more, and is usually 70% or less, preferably 60% or less, more preferably 50% or less. The porosity of the support governs the permeation flow rate at the time of separation of a gas, and when the porosity is not less than the lower limit above, diffusion of the permeate is less likely to be inhibited, whereas when it is not more than the upper limit above, the strength of the porous support tends to increase.

The surface of the porous support may be polished, if desired, with a file, etc. Here, the porous support surface means an inorganic porous support surface portion on which zeolite is crystallized, and as long as it is a surface, the surface may be any surface of each shape or may be a plurality of faces. For example, in the case of a cylindrically tubular support, the surface may be the outer-side surface or the inner-side surface and depending on the case, may be both outer-side and inner-side surfaces.

<Zeolite Membrane>

The zeolite membrane is described below. In the present invention, the zeolite membrane fulfills the role of a separation membrane. As the component constituting the zeolite membrane, in addition to zeolite, an inorganic binder such as silica and alumina, an organic compound such as polymer, an Si atom-containing material (silylating agent) for modifying the zeolite surface, which is described in detail below, a reaction product thereof, etc. may be contained, if desired. The zeolite membrane in the present invention may partially contain an amorphous component, etc. However, a zeolite membrane composed of substantially only zeolite is preferred. The term "substantially" means to permit containing an impurity derived from a raw material, etc. which does not affect the effects of the present invention In particular, the zeolite constituting the zeolite membrane is preferably an aluminosilicate.

Although the thickness of the zeolite membrane is not particularly limited, it is usually 0.1 µm or more, preferably 0.6 µm or more, more preferably 1.0 µm or more, still more preferably 1.5 µm or more, yet still more preferably 2.0 µm or more, most preferably 2.5 µm or more, and is usually 100 µm or less, preferably 60 µm or less, more preferably 20 µm or less, still more preferably 10 µm or less. If the membrane thickness is too large, the permeation amount tends to decrease, whereas if it is too small, the selectivity or membrane strength is likely to deteriorate.

Although the particle size of the zeolite is not particularly limited, if it is too small, for example, many grain boundaries tend to be generated, leading to deterioration of the selectivity, etc. The particle size is usually 30 nm or more, preferably 50 nm or more, more preferably 100 nm or more, and the upper limit is not more than the thickness of the membrane. It is more preferable for the particle size of zeolite to be the same as the thickness of the membrane.

Although The method for measuring the particle size is not particularly limited, the particle size may be measured, for example, by observing the zeolite membrane surface through SEM, observing the zeolite membrane cross-section through SEM, or observing the zeolite membrane through TEM.

The $SiO_2/Al_2O_3$ molar ratio of the zeolite constituting the zeolite membrane (zeolite membrane itself) is usually 2 or more, preferably 5 or more, more preferably 7.5 or more, still more preferably 8 or more, yet still more preferably 10 or more, even yet still more preferably 12 or more, most preferably 20 or more, and is preferably 2,000 to less, more preferably 1,000 or less, still more preferably 500 or less, yet still more preferably 100 or less, even yet still more preferably 50 or less. When the $SiO_2/Al_2O_3$ molar ratio of the zeolite membrane is in this range, the zeolite membrane becomes a membrane excellent in hydrophilicity and also excellent in acid resistance and water resistance.

The $SiO_2/Al_2O_3$ molar ratio of the zeolite constituting the zeolite membrane is a numerical value obtained by scanning electron microscope-energy dispersive X-ray spectroscopy (SEM-EDX). In SEM-EDX, the measurement is performed at an X-ray accelerating voltage of about 10 kV, whereby information of only a membrane having a thickness of several μm can be obtained. Since the zeolite membrane is uniformly formed, the $SiO_2/Al_2O_3$ molar ratio of the membrane itself can be determined by this measurement.

The main zeolite constituting the zeolite membrane preferably contains zeolite having a pore structure of not more than oxygen 12-membered ring, more preferably contains zeolite having a pore structure of not more than oxygen 10-membered ring, still more preferably contains zeolite having a pore structure of oxygen 8-membered or 10-membered ring. The value of n of the zeolite having an oxygen n-membered ring, as used herein, indicates a pore having a largest number of oxygen atoms among pores composed of oxygen and T elements (elements except for oxygen, constituting the flamework) forming the zeolite framework. For example, in the case where pores of oxygen 12-membered and 8-membered rings are present as in MOR-type zeolite, the zeolite is regarded as oxygen 12-membered ring zeolite.

The zeolite having a pore structure of not more than oxygen 12-membered ring includes, for example, AEI, AEL, AFI, AFG, ANA, ATO, BEA, BRE, CAS, CDO, CHA, CON, DDR, DOH, EAB, EPI, ERI, ESV, EUO, FAR, FAU, FER, FRA, HEU, GIS, GIU, GME, GOO, ITE, KFI, LEV, LIO, LOS, LTA, LTL, LTN, MAR, MEP, MER, MEL, MFI, MON, MOR, MSO, MTF, MTN, MTW, MWW, NON, NES, OFF, PAU, PHI, RHO, RTE, RTH, RUT, SGT, SOD, STI, STT, TOL, TON, TSC, UFI, VNI, WEI, and YUG.

Among these, the zeolite having a pore structure of not more than oxygen 10-membered ring includes, for example, AEI, AEL, AFC ; ANA, BRE, CAS, CDO, CHA, DDR, DOH, EAB, EPI, ERI, ESV, EUO, FAR, FER, FRA, HEU, GIS, GIU, GOO, ITE, KFI, LEV, LIO, LOS, LTA, LTN, MAR, MEP, MER, MEL, MFI, MON, MSO, MTF, MTN, MWW, NON, NES, PAU, PHI, RHO, RTE, RTH, RUT, SGT, SOD, STI, STT, TOL, TON, TSC, UFI, VNI, WEI, and YUG.

Furthermore, the zeolite having a pore structure of not more than oxygen 8-membered ring includes, for example, AEI, AFC; ANA, BRE, CAS, CDO, CHA, DDR, DOH, EAB, EPI, ERI, ESV, FAR, FRA, GIS, GIU, GOO, ITE, KFI, LEV, LIO, LOS, LTA, LTN, MAR, MEP, MER, MON, MSO, MTF, MTN, NON, PAU, PHI, RHO, RTE, RTH, RUT, SGT, SOD, TOL, TSC, UFI, VNI, and YUG.

In the present invention, preferable structures of the main zeolite constituting the zeolite membrane are AEI, AFG, CHA, EAB, ERI, ESV, FAR, FRA, GIS, ITE, KFI, LEV, LIO, LOS, LTN, MAR, MFI, PAU, RHO, RTH, SOD, TOL, and UFI; more preferable structures are AEI, CHA, ERI, KFI, LEV, MFI, PAU, RHO, RTH, and UFI; still more preferable structures are CHA, RHO, and MFI; yet still more preferable structures are CHA and MFI; and most preferable structure is CHA.

In the description of the present invention, as described above, the zeolite structure is denoted by the code assigned to the zeolite structure by International Zeolite Association (IZA).

Although the framework density (T/1,000 Å$^3$) of the main zeolite constituting the zeolite membrane is not particularly limited, it is usually 17 or less, preferably 16 or less, more preferably 15.5 or less, still more preferably 15 or less, and is usually 10 or more, preferably 11 or more, more preferably 12 or more.

The framework density means the number of elements (T elements) except for oxygen, constituting the framework per 1,000 Å$^3$ of zeolite, and this value depends on the zeolite structure. Incidentally, the relationship between the framework density and the zeolite structure is described in ATLAS OF ZEOLITE FRAMEWORK TYPES, Sixth Revised Edition, 2007, ELSEVIER.

When the framework is not less than the lower limit above, embrittlement of the zeolite structure is avoided, and the zeolite membrane is increased in the durability, facilitating its application to various uses. When the framework density is not more than the upper limit above, it is likely that diffusion of a substance in zeolite is not inhibited and the permeation flux of the zeolite membrane becomes high, and this is economically advantageous.

<Porous Support-Zeolite Membrane Composite>

A first embodiment of the porous support-zeolite membrane composite of the present invention is a porous support-zeolite membrane composite having a porous support and a zeolite membrane formed on the porous support, wherein part of the zeolite membrane penetrates into the inside of the support and the distance from the surface of the support to the inside of the support, into which the zeolite film penetrates, is 5.0 μm or less on average. Here, the average of the distance is a weighted average value.

The distance (weighted average value) from the surface to the inside of the porous support is preferably 4.7 μm or less, more preferably 4.2 μm or less, still more preferably 3.7 μm or less, yet still more preferably 3.2 μm or less, even yet still more preferably 2.7 μm or less, particularly preferably 2.2 μm or less, most preferably 1.7 μm or less, and is preferably 0.01 μm or more, more preferably 0.02 μm or more, still more preferably 0.03 μm or more.

Within this range, the permeance of a permeating substance increases, because, for example, diffusion of the permeating substance inside the porous support is enhanced. In addition, it is considered that when the amount of the zeolite penetrating toward the inside from the surface of the porous support is appropriately adjusted, a denser zeolite membrane is formed and the separation coefficient increases.

Usually, the required permeation performance or separation performance is different depending on the target for separation or the purpose of separation and therefore, the distance above preferably has a value providing permeation performance or separation performance suited for those conditions.

Figure 3A:
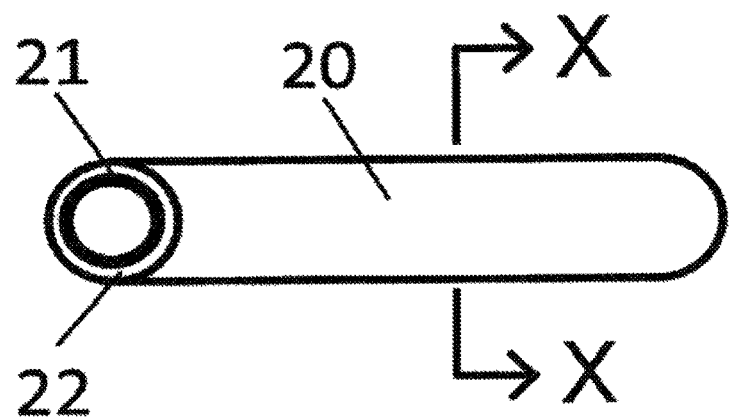
FIG. 3A is a perspective view illustrating one embodiment of the porous support-zeolite membrane composite.
Figure 3B:
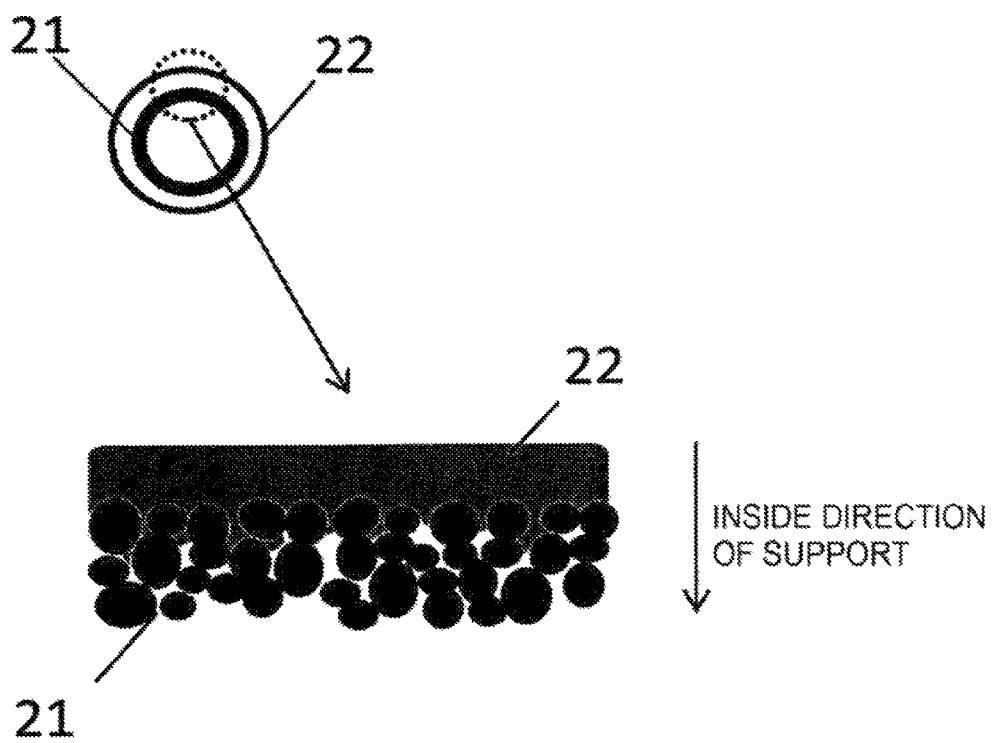
FIG. 3B is an X-X cross-sectional view of the perspective view and an enlarged view thereof.

The distance above is calculated using an SEM image of the cross-section of a porous support-zeolite membrane composite that is smoothed by a cross-section polisher. The cross-section is a cross-section where, as illustrated in FIG. 3, the boundary between the porous support and the zeolite membrane can be observed, and is obtained from one arbitrary site of the porous support-zeolite membrane composite.

As for the surface of the porous support, the zeolite membrane is distinguished from the porous support by any of the following methods 1) to 3), and the boundary thereof is defined as the surface of the porous support:
1) difference in contract of an SEM image
2) difference in signal intensity ratio between Si and Al in EDS mapping, and
3) difference in shape change by an etching rate.

In particular, when alumina or mullite is used as the porous support, since the difference in the ratio of Si and Al greatly differs between the zeolite membrane and the porous support, the method of 2) facilitates determination of the boundary.

The distance is calculated using 6 or more SEM images in a minimum visual field area of 36 µm×50 µm or more.

The distance above is a distance from the surface of the porous support to the end of the zeolite membrane having penetrated into the inside of the porous support. This end is defined as a site where a void (a void due to pore of the support) first appears on a perpendicular extending from the surface of the porous support toward the inside direction of the support.

If possible, the distance is preferably calculated maximally every pixel unit for the surface of the porous support. For simplicity, it is also possible to calculate the distance at a pitch of 1 µm for the surface of the porous support.

A second embodiment of the porous support-zeolite membrane composite of the present invention is a porous support-zeolite membrane composite having a porous support and a zeolite membrane formed on the porous support, wherein in an SEM image obtained by observing the zeolite membrane from the cross-section, the area proportion of voids present in the zeolite membrane is 0.3% or more relative to the zeolite membrane. In the porous support-zeolite membrane composite of the present invention, the presence of these voids is considered to enable promoting diffusion and obtaining a higher permeation performance.

The proportion of voids relative to the zeolite membrane can be measured as an area ratio from SEM of the cross-section and is usually 0.3% or more, preferably 0.5% or more, more preferably 0.7% or more, still more preferably 1% or more, yet still more preferably 2% or more, most preferably 3% or more, and is usually 20% or less, preferably 10% or less, more preferably 5% or less. A too large proportion is improper, because the strength of the zeolite membrane becomes insufficient. Within the range above, the permeance of a permeating substance increases due to, for example, facilitated diffusion in the zeolite membrane portion. Incidentally, in the porous support-zeolite membrane composite of the first embodiment, although the proportion of voids may be less than 0.3%, it is preferably 0.3% or more. More preferably, the range of the proportion of voids is the same as that in the second embodiment.

The proportion of voids is calculated by the method where 6 or more SEM images in a minimum visual field area of 36 µm×50 µm or more are obtained and the obtained images are binarized and compared by the bit number.

In the void, the distance of the longest straight line obtained between 2 points on the outer circumference of one void is usually 8 µm or less, preferably 7 µm or less, more preferably 6 µm or less, still more preferably 5 µm or less, yet still more preferably 4 µm or less, even yet still more preferably 3 µm or less, most preferably 2 µm or less, and is usually 0.05 µm or more, preferably 0.1 µm or more, more preferably 0.15 µm or more.

The longest straight line obtained between two points on the outer circumference as used herein is the diameter when the void is a circle, the long diameter in the case of an ellipse, and the diagonal in the case of a tetragon. If this distance is too large, the strength of the zeolite membrane may be reduced. On the other hand, if it is too small, diffusion of a permeating substance may be hardly occur in the zeolite membrane portion.

Although the production method of the porous support-zeolite membrane composite of the present invention is not particularly limited, the following method may be applied.

The method includes, for example, a method of attaching an inorganic particle onto a porous support and thereafter forming a zeolite membrane.

Although the element constituting the inorganic particle attached is not particularly limited, those containing Si or Al are preferred. Si and Al are a constituent element of zeolite and considered to little affect the composition of the obtained zeolite membrane or be less likely inhibit the membrane growth. The attached inorganic particle functions as a raw material of the zeolite membrane in the course of membrane production of zeolite and sometimes becomes part of the zeolite membrane.

The kind of the inorganic particle attached is preferably an inorganic particle other than zeolite, and more preferable examples include fumed silica, colloidal silica, alumina sol, sodium aluminate, aluminum hydroxide, pseudo boehmite, aluminum sulfate, aluminum nitrate, aluminum oxide, and amorphous aluminosilicate gel. Fumed silica, colloidal silica, and alumina sol are preferred, and fumed silica is more preferred.

Although the average primary particle diameter of the inorganic particle attached is not particularly limited, it is usually 1 nm or more, preferably 3 nm or more, more preferably 5 nm or more, still more preferably 8 nm or more, yet still more preferably 10 nm or more, even yet still more preferably 15 nm or more. When the primary particle diameter is small, the smoothness of the surface after attachment of the inorganic particle is advantageously high. The upper limit is usually 30 µm or less, preferably 25 µm or less, more preferably 20 µm or less, still more preferably 15 µm or less, yet still more preferably 10 µm or less, even yet still more preferably 5 µm or less. When the particle is not too large, the unevenness of the surface after attachment of the inorganic particle is less likely to increase and become a membrane defect at the time of membrane production. The average primary particle diameter of the inorganic particle is a value measured by the particle size distribution meter.

The optimal value of the size of the inorganic particle varies depending on the pore size distribution of the support. From such a viewpoint, it is preferable to use mullite as the porous support, because a great effect may be obtained due to the pore structure thereof.

The weight of the inorganic particle attached is usually 0.1 $g/m^2$ or more, preferably 0.3 $g/m^2$ or more, more preferably 0.5 $g/m^2$ or more, still more preferably 0.8 $g/m^2$ or more, yet still more preferably 1.0 $g/m^2$ or more. If the weight of the inorganic particle attached is too small, the effect of suppressing penetration of the zeolite membrane tends to be reduced. The weight is usually 15 $g/m^2$ or less, preferably 12.5 $g/m^2$ or less, more preferably 10 $g/m^2$ or less, still more preferably 8 $g/m^2$ or less, yet still more preferably 6 $g/m^2$ or less, even yet still more preferably 5 $g/m^2$ or less.

If the number of inorganic particles attached is too large, a defect after membrane production tends to increase.

Although the method for attaching the inorganic particle is not particularly limited, it includes, for example, a method of rubbing and attaching the inorganic particle directly to the porous support, and a method of attaching the inorganic particle by using a dispersion liquid containing the inorganic particle.

The method of attaching the inorganic particle by using a dispersion liquid includes, for example, a method of attaching the inorganic particle by dropping a dispersion liquid with a pipette on the porous support, a method of attaching the inorganic particle by dipping the porous support in the dispersion liquid, and a method of spraying the dispersion liquid onto the porous support. After attaching the inorganic particle to the porous support, drying is usually performed. The drying temperature is usually room temperature or more, preferably 30° C. or more, and is usually 300° C. or less, preferably 150° C. or less, more preferably 120° C. or less.

The concentration of the inorganic particle in the dispersion liquid is, relative to the total mass of the dispersion liquid, usually 0.01% by mass or more, preferably 0.1% by mass or more, more preferably 0.3% by mass or more, and is usually 20% by mass or less, preferably 10% by mass or less, more preferably 5% by mass or less, still more preferably 4% by mass or less, yet still more preferably 3% by mass or less. If the concentration is too low, the amount of the inorganic particle attached decreases, and the effect of suppressing penetration of the zeolite membrane may be reduced, whereas if the concentration is too high, a defect after membrane production may be increased.

Another method for producing the porous support-zeolite membrane composite of the present invention is a method of attaching a seed crystal onto the porous support and then forming the zeolite membrane, wherein the relationship between the average pore size of the porous support and the size (average particle size) of the seed crystal used in the formation of the zeolite membrane, which is described in detail below, is adjusted.

In this case, the ratio of the average particle size of the seed crystal and the average pore size of the support (average particle size of seed crystal/average pore size of support) is usually 0.3 or more, preferably 0.5 or more, more preferably 0.7 or more, still more preferably 0.8 or more, most preferably 1 or more, and is usually 10 or less, preferably 5 or less, more preferably 4 or less, still more preferably 3 or less. By this method, the conditions of hydrothermal synthesis can be made appropriate, and the amount of the zeolite penetrating into the porous support can be adjusted. The preferable range of the average pore size of the support is the same as the range described above.

The zeolite membrane is formed on the porous support to which an inorganic particle or a seed crystal is attached in this way.

The zeolite membrane may be produced by a conventionally known method and is preferably produced by, among others, hydrothermal synthesis from the viewpoint of producing a uniform membrane.

For example, a reaction mixture for hydrothermal synthesis homogenized by adjusting the composition (hereinafter, the mixture is sometimes referred to as "aqueous reaction mixture") is put in a heat-resistant pressure-resistant vessel such as autoclave, in the inside of which a porous support is loosely fixed, and the vessel is tightly closed and heated for a given time, whereby the zeolite membrane can be prepared.

The aqueous reaction mixture contains an Si element source, an Al element source, an alkali source and water and may further contain, if desired, an organic template.

As the Si element source used in the aqueous reaction mixture, for example, amorphous silica, colloidal silica, silica gel, sodium silicate, amorphous aluminosilicate gel, tetraethoxysilane (TEOS), and trimethylethoxysilane may be used.

As the Al element source, for example, sodium aluminate, aluminum hydroxide, aluminum sulfate, aluminum nitrate, aluminum oxide, and amorphous aluminosilicate gel may be used. The aqueous reaction mixture may contain other element sources, for example, an element source such as Ga, Fe, B, Ti, Zr, Sn and Zn.

In the crystallization of zeolite, an organic template (structure-directing agent) may be used, if desired. When the zeolite membrane is synthesized using an organic template, the ratio of silicon atom to aluminum atom of the crystallized zeolite is increased, and the acid resistance and water vapor resistance are enhanced.

The organic template may be any kind of template as long as the desired zeolite membrane can be formed. One kind of temperate may be used, or two or more kinds of templates may be used in combination.

In case where the zeolite is of CHA type, amines or a quaternary ammonium salt is usually used as the organic template. For example, the organic templates described in U.S. Pat. No. 4,544,538 and U.S. Patent Application Publication 2008/0075656 are preferred.

As the alkali source used in the aqueous reaction mixture, for example, a hydroxide ion of a counter anion of the organic template, an alkali metal hydroxide such as NaOH and KOH, and an alkaline earth metal hydroxide such as $Ca(OH)_2$, may be used. The kind of the alkali is not particularly limited, and Na, K, Li, Rb, Cs, Ca, Mg, Sr, Ba, etc. are usually used. Among these, Li, Na and K are preferred, and K is more preferred. Two or more kinds of alkalis may be used in combination, and specifically, it is preferable to use Na and K, or Li and K in combination.

The ratio between the Si element source and the Al element source in the aqueous reaction mixture is usually expressed as the molar ratio of oxides of respective elements, i.e., the $SiO_2/Al_2O_3$ molar ratio. Although the $SiO_2/Al_2O_3$ ratio is not particularly limited, it is usually 5 or more, preferably 8 or more, more preferably 10 or more, still more preferably 15 or more, and is usually 10,000 or less, preferably 1,000 or less, more preferably 300 or less, still more preferably 100 or less.

When the $SiO_2/Al_2O_3$ molar ratio is in this range, the zeolite membrane is densely produced and becomes a membrane having high separation performance. Furthermore, since an Al atom is moderately present in the produced zeolite, the separation performance for a gas or liquid component having adsorptivity to Al is enhanced. In addition, when Al is in the range above, a zeolite membrane having high acid resistance and high water vapor resistance is obtained.

The ratio between the silica source and the organic template in the aqueous reaction mixture is, in terms of the molar ratio of organic template to $SiO_2$ (organic template/$SiO_2$ molar ratio), usually 0.005 or more, preferably 0.01 or more, more preferably 0.02 or more, and is usually 1 or less, preferably 0.4 or less, more preferably 0.2 or less.

When the organic template/$SiO_2$ molar ratio is in the range above, a dense zeolite membrane can be produced and in addition, the produced zeolite is increased in the acid resistance and water vapor resistance.

The ratio between the Si element source and the alkali source is, in terms of $M_{(2/n)}O/SiO_2$ (wherein M represents an alkali metal or an alkaline earth metal, and n represents its valence of 1 or 2) molar ratio, usually 0.02 or more, preferably 0.04 or more, more preferably 0.05 or more, and is usually 0.5 or less, preferably 0.4 or less, more preferably 0.3 or less.

The ratio between the Si element source and water is, in terms of molar ratio of water to $SiO_2$ ($H_2O/SiO_2$ molar ratio), usually 10 or more, preferably 30 or more, more preferably 40 or more, still more preferably 50 or more, and is usually 1,000 or less, preferably 500 or less, more preferably 200 or less, still more preferably 150 or less.

When the molar ratios of the substances in the aqueous reaction mixture are in the ranges above, a dense zeolite membrane can be produced. The amount of water is particularly important in producing a dense zeolite membrane, and a dense membrane is likely to be produced under the conditions where the amount of water is large relative to silica, compared with general conditions of the powder synthesis method.

At the time of hydrothermal synthesis, although a seed crystal is not necessarily required to be present in the reaction system, crystallization of zeolite can be promoted by adding a seed crystal. The method for adding a seed crystal is not particularly limited, and as in the case of synthesis of powdery zeolite, for example, a method of adding a seed crystal to the aqueous reaction mixture, or a method of allowing a seed crystal to have been attached onto a support, may be used.

In the case of producing the porous support-zeolite membrane composite, a seed crystal has been preferably attached onto the support. By previously attaching a seed crystal onto the support, a dense zeolite membrane having good separation performance is likely to be produced.

In the case of using the above-described method of attaching an inorganic particle onto the support, although the seed crystal is usually attached after attaching the inorganic particle onto the support, depending on the case, for example, a method of loading the seed crystal and then attaching the inorganic particle, or a method of attaching the inorganic particle, loading the seed crystal, and thereafter again attaching the inorganic particle, may be appropriately combined. It is also possible to attach the seed crystal and the inorganic particle at the same time.

Although the seed crystal used may be any kind of zeolite as long as it promotes crystallization, in order to efficiently crystallize the zeolite, the seed crystal is preferably of the same crystal type as that of the zeolite membrane formed.

The particle size of the seed crystal is usually 0.5 nm or more, preferably 1 nm or more, more preferably 2 nm or more, still more preferably 10 nm or more, yet still more preferably 50 nm or more, most preferably 100 nm or more, particularly preferably 300 nm or more, and is usually 20 µm or less, preferably 15 µm or less, more preferably 10 µm or less.

The method for attaching the seed crystal onto the support is not particularly limited and, for example, a dip method of dispersing the seed crystal in a solvent such as water and dipping the support in the dispersion liquid, thereby attaching the seed crystal, and a method of coating the support with a slurry prepared by mixing the seed crystal and a solvent such as water or with the seed crystal itself, may be used. For controlling the amount of the seed crystal attached and producing a porous support-zeolite membrane composite with good reproducibility, a dip method is preferred.

Although the solvent in which the seed crystal is dispersed is not particularly limited, water is preferred, among others.

In the case of using a dispersion liquid, the amount of the seed crystal dispersed is not particularly limited and is, relative to the total mass of the dispersion liquid, usually 0.01% by mass or more, preferably 0.1% by mass or more, more preferably 0.3% by mass or more, and usually 20% by mass or less, preferably 10% by mass or less, more preferably 5% by mass or less, still more preferably 4% by mass or less, yet still more preferably 3% by mass or less.

If the amount of the seed crystal dispersed is too small, since the amount of the seed crystal attached onto the support is small, a portion in which zeolite is not produced may be partially created on the support at the time of hydrothermal synthesis to provide a defective zeolite membrane. The amount of the seed crystal attached onto the support by a dip method becomes substantially constant when the amount of the seed crystal in the dispersion liquid reaches above a certain level and therefore, an excessively large amount of the seed crystal in the dispersion liquid wastes a lot of seed crystal and is disadvantageous in view of the cost.

It is preferred that the zeolite membrane is formed by attaching the seed crystal on the support with the dip method or coating of the slurry and then drying.

The method of attaching the seed crystal by coating is sometimes preferred, because an unnecessary seed crystal can be removed and penetration of zeolite into the support when forming the zeolite membrane can thereby be suppressed.

The amount of the seed crystal that has been previously attached onto the support is not particularly limited and is, in terms of the mass per 1 $m^2$ of the base material, usually 0.01 g or more, preferably 0.05 g or more, more preferably 0.1 g or more, still more preferably 1 g or more, and usually 100 g or less, preferably 50 g or less, more preferably 10 g or less, still more preferably 8 g or less, yet still more preferably 5 g or less.

If the amount of the seed crystal is less than the lower limit, a crystal is less likely to be formed, resulting in insufficient growth of the zeolite membrane or non-uniform growth of the membrane. If the amount of the seed crystal exceeds the upper limit, the unevenness of the surface may be increased by the seed crystal, or spontaneous nuclei may readily grow due to a seed crystal fallen from the support, inhibiting the zeolite membrane growth on the support. In any case, a dense zeolite membrane tends to be hardly produced.

In the case of forming the zeolite membrane on the support by hydrothermal synthesis, the method for fixing the support is not particularly limited, and the support may be fixed in any of vertical, horizontal and other configurations. In this case, the zeolite membrane may be formed by a static method, or the zeolite membrane may be formed by stirring the aqueous reaction mixture.

Although the temperature at the time of forming the zeolite membrane is not particularly limited, it is usually 100° C. or more, preferably 120° C. or more, more preferably 150° C. or more, and is usually 200° C. or less, preferably 190° C. or less, more preferably 180° C. or less. If the reaction temperature is too low, zeolite may be hardly crystallized. If the reaction temperature is too high, zeolite of a type different from the required zeolite may be readily produced.

Although the heating time is not particularly limited, it is usually 1 hour or more, preferably 5 hours or more, more preferably 10 hours or more, and is usually 10 days or less, preferably 5 days or less, more preferably 3 days or less, still more preferably 2 days or less. If the reaction time is too short, zeolite may be hardly crystallized. If the reaction time is too long, zeolite of a type different from the required zeolite may be readily produced.

The pressure at the time of formation of the zeolite membrane is not particularly limited, and a self-generated pressure created when heating the aqueous reaction mixture in a closed vessel at the temperature in the range above may be sufficient. If desired, an inert gas such as nitrogen may be added.

The porous support-zeolite membrane composite obtained by hydrothermal synthesis is washed with water, then subjected to a heat treatment and thereby dried. For the washing with water, hot water may be used. The heat treatment as used herein means to dry the porous support-zeolite membrane composite by applying heat or calcine the template in the case of using a template.

In the case of aiming at drying, the temperature of the heat treatment is usually 50° C. or more, preferably 80° C. or more, more preferably 100° C. or more, and is usually 200° C. or less, preferably 150° C. or less. In the case of aiming at calcination of the template, the temperature is usually 350° C. or more, preferably 400° C. or more, more preferably 430° C. or more, still more preferably 480° C. or more, and is usually 900° C. or less, preferably 850° C. or less, more preferably 800° C. or less, still more preferably 750° C. or less.

In the case of aiming at calcination of the template, if the temperature of the heat treatment is too low, the proportion of the remaining organic template tends to increase, leading to a decrease in the number of pores of zeolite, and the permeation rate at the time of separation/concentration may be reduced. If the heat treatment temperature is too high, the difference in the coefficient of thermal expansion between support and zeolite may be increased to readily cause cracking in the zeolite membrane, or the denseness of the zeolite membrane may be lost, resulting in low separation performance.

The heating time is not particularly limited as long as the time is long enough to sufficiently dry the zeolite membrane or calcine the template, and the heating time is preferably 0.5 hours or more, more preferably 1 hour or more. The upper limit is not particularly limited and is usually within 200 hours, preferably within 150 hours, more preferably within 100 hours. In the case of aiming at calcination of the template, the heat treatment may be performed in an air atmosphere and may be performed in an atmosphere where oxygen or an inert gas such as nitrogen is added.

The temperature rise rate during heat treatment aiming at calcination of the template is preferably as low as possible so as to reduce the occurrence of cracking in the zeolite membrane due to difference in the coefficient of thermal expansion between support and zeolite. The temperature rise rate is usually 5° C./min or less, preferably 2° C./min or less, more preferably 1° C./min or less, still more preferably 0.5° C./min or less, and in view of workability, is usually 0.1° C./min or more.

The temperature drop rate after calcination must also be controlled so as to avoid occurrence of cracking in the zeolite membrane. As with the temperature rise rate, the temperature drop rate is preferably as low as possible. The temperature drop rate is usually 5° C./min or less, preferably 2° C./min or less, more preferably 1° C./min or less, still more preferably 0.5° C./min or less, and in view of workability, is usually 0.1° C./min or more.

The zeolite membrane may be ion-exchanged, if desired. In the case of synthesis using a template, the ion exchange is usually performed after removing the template. The ion as the exchanging ion includes, for example, a proton, an alkali metal ion such as $Na^+$, $K^+$ and $Li^+$, Group 2 element ion such as $Ca^{2+}$, $Mg^{2+}$, $Sr^{2+}$ and $Ba^{2+}$, an ion of a transition metal such as Fe and Cu, and ions of other metals such as Al, Ga and Zn. Among these, a proton, an alkali metal ion such as $Na^+$, $K^+$ and $Li^+$, and ions of Fe, Al and Ga are preferred.

The ion exchange may be performed, for example, by a method where the zeolite membrane after calcination (e.g., in the case of using a template) is treated with an aqueous solution containing an ammonium salt such as $NH_4NO_3$ and $NaNO_3$ or an exchanging ion, and depending on the case, with an acid such as hydrochloric acid, usually at a temperature of from room temperature to 100° C. and then washed with water. Furthermore, the membrane may be calcined at 200° C. to 500° C., if desired.

The air permeation amount $[L/(m^2 \cdot h)]$ of the thus-obtained porous support-zeolite membrane composite (porous support-zeolite membrane composite after heat treatment) is usually 1,400 $L/(m^2 \cdot h)$ or less, preferably 1,200 $L/(m^2 \cdot h)$ or less, more preferably 1,000 $L/(m^2 \cdot h)$ or less, still more preferably 900 $L/(m^2 \cdot h)$ or less, yet still more preferably 800 $L/(m^2 \cdot h)$ or less, even yet still more preferably 700 $L/(m^2 \cdot h)$ or less, most preferably 600 $L/(m^2 \cdot h)$ or less. Although the lower limit of the permeation amount is not particularly limited, it is usually 0.01 $L/(m^2 \cdot h)$ or more, preferably 0.1 $L/(m^2 \cdot h)$ or more, more preferably 1 $L/(m^2 \cdot h)$ or more.

The air permeation amount as used herein is, as described below, the air permeation amount $[L/(m^2 \cdot h)]$ when the porous support-zeolite membrane composite is connected to a vacuum line at an absolute pressure of 5 kPa.

The obtained zeolite membrane may be further subjected to a surface treatment with a silicon-containing compound, etc.

In the porous support-zeolite membrane composite of the present invention, the permeation rate (permeance) of carbon dioxide under the conditions of a temperature of 50° C. and a differential pressure of 0.10 MPa is preferably $1 \times 10^{-7}$ $[mol/(m^2 \cdot s \cdot Pa)]$ or more, more preferably $7 \times 10^{-7}$ $[mol/(m^2 \cdot s \cdot Pa)]$ or more, still more preferably $1 \times 10^{-6}$ $[mol/(m^2 \cdot s \cdot Pa)]$ or more, yet still more preferably $2 \times 10^{-6}$ $[mol/(m^2 \cdot s \cdot Pa)]$ or more. The upper limit is not particularly limited and is usually $3 \times 10^{-4}$ $[mol/(m^2 \cdot s \cdot Pa)]$ or less.

Here, the permeance is a value obtained by dividing the permeating substance amount by the product of the membrane area, the time and the partial pressure difference of the permeating substance between feed side and permeate side.

Similarly, the methane permeance under the conditions of a temperature of 50° C. and a differential pressure of 0.10 MPa is usually $3 \times 10^{-7}$ $[mol/(m^2 \cdot s \cdot Pa)]$ or less, preferably $5 \times 10^{-8}$ $[mol/(m^2 \cdot s \cdot Pa)]$ or less, more preferably $8 \times 10^{-9}$ $[mol/(m^2 \cdot s \cdot Pa)]$ or less, and the permeance is ideally 0.

The ideal separation coefficient when allowing carbon dioxide and methane to permeate at a temperature of 50° C. and a differential pressure of 0.10 MPa is usually 10 or more, preferably 20 or more, more preferably 50 or more, still more preferably 100 or more, yet still more preferably 150 or more. Although the upper limit is not particularly limited, it is 100,000 or less.

The ideal separation coefficient when allowing a mixed gas of carbon dioxide and methane in a volume ratio of 1:1 to permeate at a temperature of 50° C. and a differential pressure of 0.3 MPa is usually 10 or more, preferably 20 or more, more preferably 50 or more, still more preferably 100 or more, yet still more preferably 150 or more. Although the upper limit is not particularly limited, it is 100,000 or less.

<Separation Method, Concentration Method>

The porous support-zeolite composite of the present invention is preferably used for separation, etc. of a gas mixture.

For example, a gas or liquid mixture composed of a plurality of components (substances) is brought into contact with the porous support-zeolite membrane composite of the present invention to separate by permeation a high-permeability component from the mixture or concentrate a low-permeability component by permeation and separation of a high-permeability component.

A gas or liquid mixture composed of a plurality of components is brought into contact with either one side, the support side or the zeolite membrane side, through the porous support provided with the zeolite membrane, and the pressure on the opposite side is set to be lower than the pressure on the side contacted with the mixture, whereby a high-permeability substance (a relatively-high permeability substance in the mixture) is allowed to permeate selectively, i.e., as a main component of the permeable substance. In this way, a high-permeability substance can be separated from the mixture. As a result, the concentration of a specific component (a relatively-low permeability substance in the mixture) in the mixture is increased, and the specific component can thereby be separated/recovered or concentrated.

The mixture as the target for separation or concentration is not particularly limited as long as it is a gas or liquid mixture composed of a plurality of components capable of being separated or concentrated with the porous support-zeolite membrane composite of the present invention, and any mixture may be used.

In the case where the mixture as the target for separation or concentration is, for example, a mixture of an organic compound and water (hereinafter, this mixture is sometimes simply referred to as "water-containing organic compound"), though it may vary depending on the $SiO_2/Al_2O_3$ molar ratio of zeolite constituting the zeolite membrane, water usually has high permeability through the zeolite membrane, and therefore, while water is separated from the mixture, the organic compound is concentrated in the original mixture.

The separation or concentration method called a pervaporation method (permeation-vaporization method) or a vapor permeation method (vapor penetration method) is one embodiment of the method of the present invention. The pervaporation method is a separation or concentration method of directly introducing a liquid mixture into the separation membrane, and the process including separation or concentration can thereby be made simple and easy.

The water-containing organic compound may be a compound in which the water content is previously adjusted by an appropriate water content adjusting method. The water content adjusting method includes methods known per se, for example, distillation, pressure swing adsorption (PSA), temperature swing adsorption (TSA), and desiccant system.

From the water-containing organic compound from which water is separated through the porous support-zeolite membrane composite, water may be further separated, whereby water can be more highly separated and the water-containing organic compound can be more highly concentrated.

The organic compound includes, for example, carboxylic acids such as acetic acid, acrylic acid, propionic acid, formic acid, lactic acid, oxalic acid and benzoic acid; organic acids such as sulfonic acid, sulfinic acid, barbituric acid, uric acid, phenol, enol, diketone-type compound, thiophenol, imide, oxime, aromatic sulfonamide and primary or secondary nitro compound; alcohols such as methanol, ethanol and isopropanol (2-propanol); ketones such as acetone and methyl isobutyl ketone; aldehydes such as acetaldehyde; ethers such as dioxane and tetrahydrofuran; nitrogen-containing organic compounds (N-containing organic materials), e.g., amide such as dimethylformamide and N-methylpyrrolidone; and esters such as acetic acid ester and acrylic acid ester.

The mixture as the target for separation or concentration may be a gas mixture (mixed gas).

In the removal of water from a liquid mixture, for example, in the case of a pervaporation method, the porous support-zeolite membrane composite is originally dipped in a to-be-treated liquid (liquid mixture), providing a state where the porous support-zeolite membrane composite contains water. Although it may vary depending on the $SiO_2/Al_2O_3$ molar ratio of the zeolite membrane, the zeolite membrane usually has high affinity for water. Accordingly, after the start of separation, water is adsorbed into pores of the zeolite membrane, and the treatment is performed in such a manner as pushing out water contained in the porous support-zeolite membrane composite by an amount equal to the amount of water adsorbed. At this time, since the molecules are mainly in a liquid state inside the zeolite membrane, it is considered that the transfer rate of the molecules is low and the treatment is performed with relatively little resistance from the zeolite membrane. However, in the case of separation of a gas mixture, although it may vary depending on the molecule, pressure and temperature, the molecules having entered the zeolite membrane are present mainly in a gas state, and it is considered that the transfer rate is high and the zeolite membrane therefore becomes a resistance, compared with liquid separation. Above all, in the portion where the zeolite membrane has penetrated into the inside of the support, the area of the zeolite membrane is small and in turn, the resistance is considered to be more increased. Accordingly, unless the composite is designed to reduce the portion of the zeolite membrane penetrated into the support as much as possible, the permeation of a to-be-treated gas does not smoothly proceed, and the permeation amount cannot be increased.

The porous support-zeolite membrane composite of the present invention is designed such that the zeolite membrane less penetrates into the inside of the support and the permeation resistance is thereby reduced. From such a viewpoint, the porous support-zeolite membrane composite of the present invention can be said to be suitable particularly for separation of a gas mixture.

The mixed gas includes, for example, those containing at least one component selected from carbon dioxide, hydrogen, oxygen, nitrogen, methane, ethane, ethylene, propane, propylene, normal butane, isobutane, 1-butene, 2-butene, isobutene, sulfur hexafluoride, helium, carbon monoxide, nitrogen monoxide, hydrosulfuric acid, etc. Of these gas components, a vapor component having a high permeance is separated by permeating through the porous support-zeolite membrane composite, and a vapor component having a low permeance is concentrated on the feed gas side.

In particular, although it may vary depending on the structure of the zeolite membrane, the mixed gas preferably contains at least one kind of a gas molecule having a kinetic diameter of 4 Å or less. According to the present invention, even for a gas containing, as at least one component, a component having a kinetic diameter of 4 Å or less, concentration of a low-permeability component due to separation of a high-permeability component or permeation of a high-permeability component can be performed with high separation performance.

As the mixed gas, at least two components out of the components above are contained. In this case, the two components are preferably a component having a high permeance and a component having a low permeance.

The mixed gas specifically includes a mixed gas containing oxygen, a mixed gas containing methane and helium, and a mixed gas containing carbon dioxide and nitrogen, and the zeolite membrane composite can be used for separation or concentration of, e.g., air, natural gas, combustion gas, coke oven gas, biogas such as landfill gas generated from landfill area, and methane steam reforming gas produced and discharged in petrochemical industries.

In the case of using a mixed gas containing oxygen, the zeolite membrane composite is preferably used for separating oxygen from the mixed gas or allowing permeation of oxygen from the mixed gas. The mixed gas containing oxygen includes air, etc.

In the case of using a mixed gas containing methane and helium, the zeolite membrane composite is preferably used for separating helium from the mixed gas or allowing permeation of helium from the mixed gas. The mixed gas containing methane and helium includes natural gas, etc.

In the case of using a mixed gas containing carbon dioxide and nitrogen, the zeolite membrane composite is preferably used for separating carbon dioxide from the mixed gas or allowing permeation of carbon dioxide from the mixed gas. The mixed gas containing carbon dioxide and nitrogen includes combustion gas, etc.

The zeolite membrane for use in the present invention has high permeability to oxygen. Accordingly, by bringing a mixed gas containing oxygen into contact with the zeolite membrane to cause separation, the oxygen concentration in the mixed gas containing oxygen, for example, in air can be increased, and a mixed gas having a high oxygen concentration can be produced.

For example, when air is used as the mixed gas, the oxygen concentration can be increased to 30% or more, further 35% or more.

In addition, the zeolite membrane for use in the present invention has high permeability to helium. Accordingly, by bringing, for example, a natural gas containing helium or methane into contact with the zeolite membrane, helium can be separated.

Furthermore, the zeolite membrane for use in the present invention has high permeability to carbon dioxide. Accordingly, by bringing, for example, a combustion gas containing carbon dioxide or nitrogen into contact with the zeolite membrane, carbon dioxide can be separated.

It is particularly preferred embodiment to separate carbon dioxide by bringing, for example, a natural gas containing carbon dioxide or helium into contact with the zeolite membrane.

As for the conditions of separation or concentration of these mixed gases, the conditions known per se may be employed according to the target gas species, composition, etc.

As the form of the separation membrane module having the porous support-zeolite membrane composite used for separation of a mixed gas, a flat membrane type, a spiral type, a hollow fiber type, a cylinder type, a honeycomb type, etc. may be conceived, and an optimal form is selected according to the application target.

The module may be fabricated as a multi-stage module according to the process, or a treated gas may be returned to the pre-stage module. In the case of a multi-stage module, the kind of the zeolite membrane may be changed. Known methods may be appropriately employed in combination according to the process.

A cylindrical separation membrane module as one of the modules is described below.

In FIG. 1, a cylindrical porous support-zeolite membrane composite 1 is disposed in a thermostat chamber (not shown) in the state of being housed in a stainless steel-made pressure-resistant container 2. In the thermostat chamber, a temperature controller is attached so that the temperature of the sample gas can be adjusted.

One end of the cylindrical porous support-zeolite membrane composite 1 is sealed up with a columnar or circular end pin 3. The other end is connected to a connection part 4, and the other end of the connection part 4 is connected to the pressure-resistant container 2. The inside of the cylindrical porous support-zeolite membrane composite 1 and a pipe 11 for discharging a permeated gas 8 are connected via the connection part 4, and the pipe 11 extends outside the pressure-resistant container 2. A pipe 12 for feeding a sweep gas 9 is inserted into the porous support-zeolite membrane composite 1 via the pipe 11. Furthermore, a pressure gauge 5 for measuring the pressure on the feed side of the sample gas (mixed gas) and a back pressure valve 6 for adjusting the pressure on the feed side are connected to any site communicating with the pressure-resistant container 2. Each connection part is airtightly connected.

A sample gas (feed gas 7) is fed between the pressure-resistant container 2 and the porous support-zeolite membrane composite 1 at a constant flow rate, and the pressure on the feed side is made constant by the back pressure valve 6. The gas is allowed to permeate through the porous support-zeolite membrane composite 1 according to the partial pressure difference between inside and outside of the porous membrane-zeolite membrane composite 1 and discharged as a discharge gas 10 via the pipe 11.

As for the gas separation temperature from the mixed gas, the separation is performed at a temperature of 0 to 500° C. In view of the separation properties of the zeolite membrane, the temperature is usually from room temperature to 100° C. or less, preferably 50° C. or less, more preferably 40° C. or less, and still more preferably 30° C. or less. In the case where the mixed gas contains a component with possibility of condensation, the temperature is preferably set to a temperature not lower than the condensation point of each component, i.e., a temperature not causing condensation according to the partial pressure.

In the case of separation from a mixed gas, although the pressure of the mixed gas is not particularly limited, a higher pressure usually provides a larger driving force and is preferred. The pressure is usually not less than the atmospheric pressure, preferably 0.1 MPa or more, more preferably 0.2 MPa or more, still more preferably 0.5 MPa or more, yet still more preferably 1 MPa or more, and is usually 20 MPa or less, preferably 10 MPa or less, more preferably 8 MPa or less, still more preferably 6 MPa or less.

In the case of performing such separation, the treating method and the treating apparatus may be appropriately devised according to the process, for example, may include removal of a liquid substance or a high-boiling-point compound by dehydration, adsorption or other methods based on a treatment such as heating or depressurization, which is performed as a pretreatment, or a filter, etc. for removing a solid material.

EXAMPLES

Although the invention is described more specifically below based on Experimental Examples (Examples, Comparative Examples), the present invention is not limited to the following Experimental Examples as long as the gist thereof is observed.

In the following Examples, the physical properties and separation performance of the porous support and/or zeolite membrane in the porous support-zeolite membrane composite were measured by the following methods.

(1) X-Ray Diffraction (XRD)

The XRD measurement was performed under the following conditions.

Name of apparatus: X' PertPro MPD manufactured by Netherlands PANalytical

Optical system specification:
Incidence side:
Encapsulated X-ray tube (CuKα)
Soller Slit (0.04 rad)
Divergence Slit (Valiable Slit)
Stage: XYZ stage
Light-receiving side:
Semiconductor array detector (X' Celerator) Ni-filter
Soller Slit (0.04 rad)
Goniometer radius: 240 mm Measurement conditions
X-Ray output (CuKα): 45 kV, 40 mA
Scanning axis: θ/2θ
Scanning range (2θ): 5.0-70.0°
Measurement mode: Continuous
Reading width: 0.05°
Counting time: 99.7 sec
Automatic variable slit (Automatic-DS): 1 mm (irradiation width)
Lateral diffusion mask: 10 mm (irradiation width)

An X-ray was applied in a direction perpendicular to the axial direction of the cylindrically tubular porous support-zeolite membrane composite. Out of two lines defined by the contact of the cylindrically tubular porous support-zeolite membrane composite with planes parallel to the stage surface, the X-ray was applied to hit mainly another line above the stage surface rather than the line in contact with the stage surface so as to minimize entering of noise, etc.

In the measurement, the irradiation width was fixed to 1 mm by the automatic variable slit, and using XRD analysis software JADE 7.5.2 (Japanese version) of Materials Data Inc., an XRD pattern was obtained by performing a conversion of variable slit→fixed slit.

(2) SEM

The SEM measurement was performed under any of the following conditions. At the time of measurement of the cross-section of the porous support-zeolite membrane composite, a cross-section smoothed by a cross-section polisher was used.

Model name of machine: ULTRA 55 (manufactured by Zeiss)
Accelerating voltage: 10 kV
Detector: Chamber SE detector, reflection electron detector (Centaurus)
Model name of machine: S-4500 (manufactured by Hitachi High-Technologies Corporation)
Accelerating voltage: 15 kV, 10 kV
Detector: Upper detector, lower detector (3) EDS Mapping Model name of machine: Quantax 200 (manufactured by Bruker)
Detector: XFlash
Integration time of mapping: 6,000 seconds
Elements detected: Si, Al (4) Single-Component Gas Permeation Test The single-component gas permeation test was performed as follows by using an apparatus schematically illustrated in FIG. 1. The sample gases used were carbon dioxide (purity: 99.9%, produced by Koatsu Gas Kogyo Co., Ltd.), methane (purity: 99.999%, produced by Japan Fine Products), hydrogen (purity: 99.99% or more, generated from hydrogen generator OPGU-2200 manufactured by HORIBA STEC Co., Ltd.), and nitrogen (purity: 99.99%, produced by Toho Sanso Kogyo Co., Ltd.).

In FIG. 1, the cylindrical porous support-zeolite membrane composite 1 is disposed in a thermostat chamber (not shown) in the state of being housed in a stainless steel-made pressure-resistant container 2. In the thermostat chamber, a temperature controller is attached so that the temperature of the sample gas can be adjusted.

One end of the cylindrical porous support-zeolite membrane composite 1 is sealed up with a columnar end pin 3. The other end is connected to a connection part 4, and the other end of the connection part 4 is connected to the pressure-resistant container 2. The inside of the cylindrical porous support-zeolite membrane composite 1 and a pipe 11 for discharging a permeated gas 8 are connected via the connection part 4, and the pipe 11 extends outside the pressure-resistant container 2. A pressure gauge 5 for measuring the pressure on the feed side of the sample gas is connected to the pressure-resistant container 2. Each connection part is airtightly connected.

In the apparatus of FIG. 1, a sample gas (feed gas 7) is fed between the pressure-resistant container 2 and the porous support-zeolite membrane composite 1 at a constant pressure, and the permeated gas 8 allowed to permeate through the porous support-zeolite membrane composite is measured by a flowmeter (not shown) connected to the pipe 11.

More specifically, for removing a component such as water or air, the system is dried at a temperature not lower than the measurement temperature and degassed or purged with the feed gas used and after adjusting the sample temperature and the differential pressure between the feed gas side 7 and the permeated gas side 8 of the porous support-zeolite membrane composite 1 to be constant and settling the permeated gas flow rate, the flow rate of the sample gas (permeated gas 8) having permeated through the porous support-zeolite membrane composite 1 is measured, and the gas permeance $[mol \cdot (m^2 \cdot s \cdot Pa)^{-1}]$ is calculated. As the pressure at the time of calculation of the permeance, the pressure difference (differential pressure) between feed side and permeate side of the feed gas is used.

Based on the measurement results above, the ideal separation coefficient α is calculated according to the following formula (1):

$$\alpha = (Q_1/Q_2)/(P_1/P_2) \qquad (1)$$

[in formula (1), $Q_1$ and $Q_2$ represent the permeation amount $[mol \cdot (m^2 \cdot s)^{-1}]$ of the high-permeability gas and the low-permeability gas, respectively, and $P_1$ and $P_2$ represent the pressure [Pa] of the feed gas, i.e., the high-permeability gas and the low-permeability gas, respectively].

Example 1

Fumed silica (Aerosil 300, produced by Nippon Aerosil Co., Ltd.) as inorganic particle was attached onto a mullite-made porous support, and CHA-type aluminosilicate zeolite was directly hydrothermally synthesized to manufacture a porous support-CHA-type zeolite membrane composite.

A reaction mixture for hydrothermal synthesis was prepared as follows.

To 1.4 g of an aqueous 1 mol/L-NaOH solution and 5.8 g of an aqueous 1 mol/L-KOH solution, 0.195 g of aluminum hydroxide (containing 53.5% by mass of $Al_2O_3$, produced by Aldrich) was added and dissolved with stirring, and 114 g of desalted water was further added and stirred to provide a transparent solution. Thereto, 2.4 g of an aqueous N,N,N-trimethyl-1-adamantanammonium hydroxide (hereinafter, referred to as "TMADAOH") solution (containing 25% by mass of TMADAOH, produced by SACHEM Inc.) was added as an organic template, and 110.8 g of colloidal silica (Snowtex-40, produced by Nissan Chemicals Industries, Ltd.) was added and stirred for 30 minutes to prepare an aqueous reaction mixture.

The composition (molar ratio) this reaction mixture was $SiO_2/Al_2O_3/NaOH/KOH/H_2O/TMADAOH=1/0.014/0.02/0.08/100/0.04$ and $SiO_2/Al_2O_3=70$.

As the porous support, a porous mullite tube (produced by Nikkato Corp., outer diameter: 12 mm, inner diameter: 9 mm, average pore size: 1.46 μm) was cut into a length of 80 mm, washed with desalted water, dried and then used.

Subsequently, 0.5% by mass of a dispersion liquid prepared by dispersing fumed silica in water was dropped with a pipette over an entire outer surface of the porous support to attach fumed silica to the porous support, followed by drying at 120° C. for 2 hours. The change in weight after drying was 1.9 g/m².

As the seed crystal, a CHA-type zeolite crystallized from a gel composition (molar ratio) of $SiO_2/Al_2O_3/NaOH/KOH/H_2O/TMADAOH=1/0.033/0.1/0.06/40/0.07$ by hydrothermal synthesis at 160° C. for 2 days was used. The support above was dipped for a predetermined time in a dispersion liquid obtained by dispersing the seed crystal in 1% by mass of water to attach the seed crystal by a dip method and dried at 140° C. for 1 hour or more, whereby the seed crystal was attached. The increase in mass after drying was 2.2 g/m².

The support attached with the seed crystal was dipped in the vertical direction in a Teflon (registered trademark)-made inner cylinder (200 ml) containing the aqueous reaction mixture above and after tightly closing an autoclave, heated at 180° C. for 18 hours in a static condition under self-generated pressure. After the elapse of a predetermined time, the system was allowed to cool, and the porous support-zeolite membrane composite was taken out of the reaction mixture, washed and then dried at 120° C. for 1 hour or more.

The mass of the CHA-type zeolite crystallized on the support was determined from the difference between the mass of the porous support-zeolite membrane composite after calcination and the mass of the porous support and found to be 123 g/m².

Figure 2:
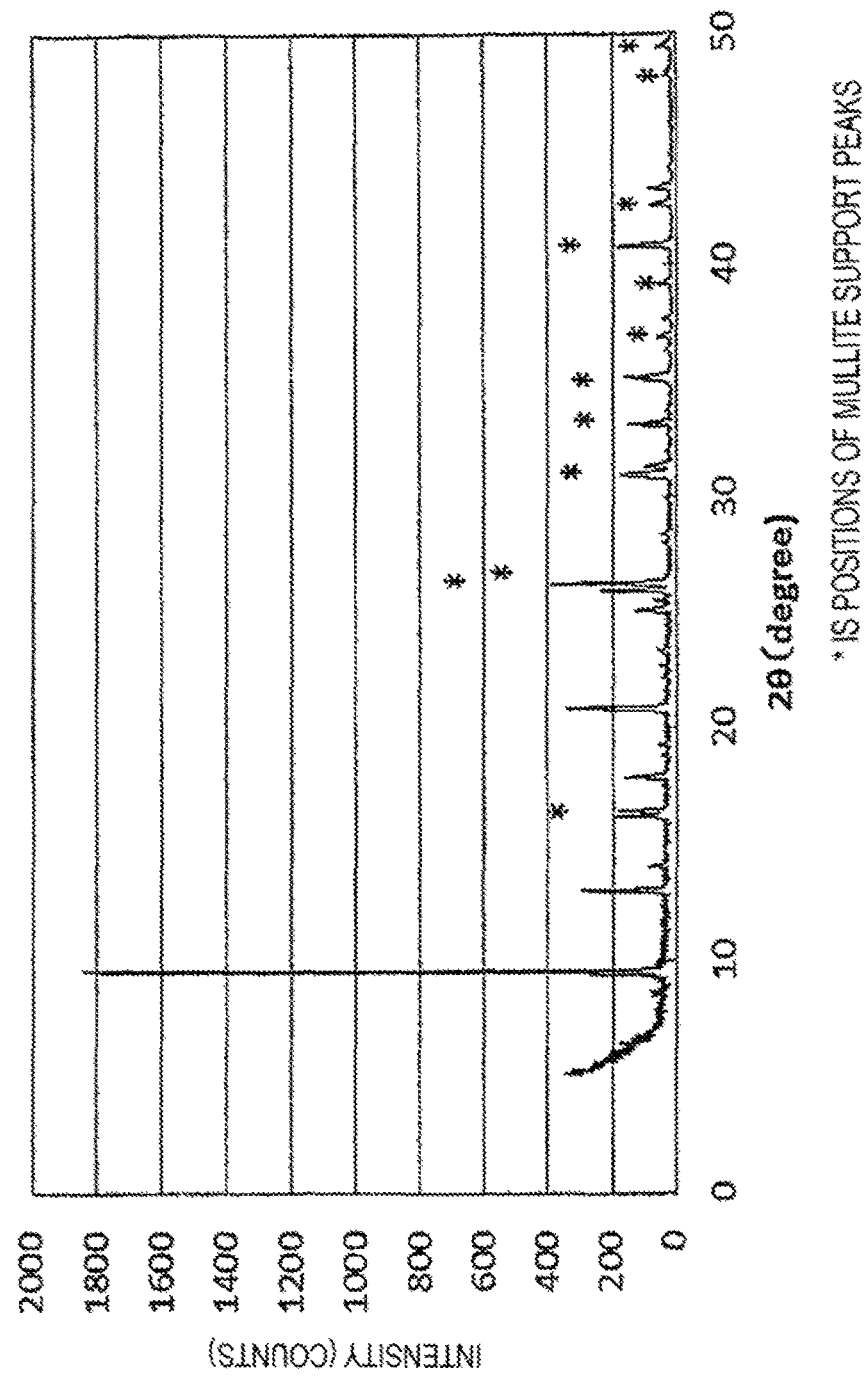
FIG. 2 is an XRD pattern of the zeolite membrane produced in Example 1.

FIG. 2 illustrates an XRD pattern of the zeolite membrane produced. It was found from the XRD measurement that CHA-type zeolite was produced.

From the images in 10 visual fields obtained by SEM observation at a magnification of 2,000 times of a smooth surface created by cutting out an arbitrary part of the cross-section and polishing it with a cross-section polisher, the weighted average of the distance between the porous support surface and the zeolite membrane having penetrated toward the inside from the porous support surface was measured and found to be 2.1 μm. This value reveals less penetration of the zeolite membrane into the support.

In addition, the area proportion of voids present in the zeolite membrane relative to the zeolite membrane was measured in 5 visual fields of a cross-sectional SEM image, as a result, the average value was 3.2%.

Using the porous support-zeolite membrane composite manufactured above, a single-component gas permeation test was performed. As a pretreatment, carbon dioxide (feed gas 7) was introduced between the pressure-resistant container 2 and the cylinder of the porous support-zeolite membrane composite 1 and by keeping the pressure at about 0.2 MPa and setting the pressure inside the cylinder of the porous support-zeolites membrane composite 1 to 0.1 MPa (atmospheric pressure), the porous support-zeolite membrane composite was dried at 50° C. until the permeation amount of carbon dioxide was settled.

Thereafter, the pressure on the feed side was set to 0.2 MPa, and the feed gas was changed to each evaluation gas. The gases evaluated are carbon dioxide, methane, hydrogen, and nitrogen. At this time, the differential pressure between the feed gas 7 side and the permeated gas 8 side of the porous support-zeolite membrane composite 1 was 0.1 MPa.

The obtained permeance of each gas is shown in Table 1. The permeance of carbon dioxide at 50° C. showed a high value of $3.3 \times 10^{-6}$ [mol/(m²·s·Pa)]. In the case of hydrogen, a high value of $1.5 \times 10^{-6}$ [mol/(m²·s·Pa)] was obtained as well, revealing that a porous support-zeolite membrane composite with a high permeance was obtained. The ideal separation coefficient α at 50° C. of carbon dioxide and methane was 77.

TABLE 1

| Gas | Permeance (mol/m²sPa) |
| --- | --- |
| $CO_2$ | $3.3 \times 10^{-6}$ |
| $H_2$ | $1.5 \times 10^{-6}$ |
| $N_2$ | $2.8 \times 10^{-7}$ |
| $CH_4$ | $4.3 \times 10^{-8}$ |

Example 2

A porous support-zeolite membrane composite was obtained by the same method as in Example 1 except that the conditions for attaching fumed silica (Aerosil 300, produced by Nippon Aerosil Co., Ltd.) were changed.

The porous support was dipped in 0.3% by mass of a dispersion liquid obtained by dispersing fumed silica in water to attach fumed silica by a dip method, followed by drying at 140° C. for 1 hour. The change in weight after drying was 0.42 g/m². The increase in mass after attaching the seed crystal and drying it was 2.3 g/m², and the mass of the CHA-type zeolite, calculated from the increase in weight after membrane production and calcination, was 121 g/m².

From the images in 9 visual fields obtained by SEM observation at a magnification of 2,000 times of a smooth surface created by cutting out an arbitrary part of the cross-section and polishing it with a cross-section polisher, the weighted average of the distance from the porous support surface was measured and found to be 4.6 μm. This value reveals less penetration of the zeolite membrane into the support.

Using the porous support-zeolite membrane composite manufactured above, a single-component gas permeation test was performed by the same method as in Example 1. The obtained permeance of each gas is shown in Table 2. The permeance of carbon dioxide at 50° C. was $1.4 \times 10^{-6}$ [mol/(m²·s·Pa)], and the permeance of hydrogen was $4.2 \times 10^{-7}$ [mol/(m²·s·Pa)]. The ideal separation coefficient α at 50° C. of carbon dioxide and methane was 195. These results reveal that although the amount of fumed silica attached was smaller than in Example 1 and the degree of enhancement of the permeation performance was therefore low compared to that in Example 1, high separation performance was obtained. It was understood that the separation performance can be enhanced by suppressing the penetration into the porous support.

TABLE 2

| Gas | Permeance (mol/m²sPa) |
|---|---|
| $CO_2$ | $1.4 \times 10^{-6}$ |
| $H_2$ | $4.2 \times 10^{-7}$ |
| $N_2$ | $8.2 \times 10^{-8}$ |
| $CH_4$ | $7.0 \times 10^{-9}$ |

Example 3

A tube of a ceramic sintered body is cut into a length of 80 mm, washed with desalted water, dried and then used as the porous support. The average pore size of this porous support is about 0.9 µm.

As the seed crystal, a CHA-type zeolite having an average particle size of about 1.2 µm is used. The support above is dipped for a predetermined time in a dispersion liquid obtained by dispersing the seed crystal in 1% by mass or water to attach the seed crystal by a dip method and dried at 140° C. for 1 hour or more, whereby the seed crystal is attached.

The support attached with the seed crystal is dipped in the vertical direction in a Teflon (registered trademark)-made inner cylinder (200 ml) containing the same aqueous reaction mixture as in Example 1 and after tightly closing an autoclave, heated at 180° C. for about 18 hours in a static condition under self-generated pressure. After the elapse of a predetermined time, the system is allowed to cool, and the porous support-zeolite membrane composite is taken out of the reaction mixture, washed and then dried at about 120° C. for 1 hour or more.

From the images in 10 visual fields obtained by SEM observation at a magnification of 2,000 times of a smooth surface created by cutting out an arbitrary part of the cross-section and polishing it with a cross-section polisher, the weighted average of the distance between the porous support surface and the zeolite membrane having penetrated toward the inside from the porous support surface is measured and found to be about 0.7 µm. This value reveals less penetration of the zeolite membrane into the support.

Using the porous support-zeolite membrane composite manufactured above, a single-component gas permeation test is performed. As a pretreatment, carbon dioxide (feed gas 7) is introduced between the pressure-resistant container 2 and the cylinder of the porous support-zeolite membrane composite 1 and by keeping the pressure at about 0.2 MPa and setting the pressure inside the cylinder of the porous support-zeolite membrane composite 1 to 0.1 MPa (atmospheric pressure), the porous support-zeolite membrane composite is dried at 50° C. until the permeation amount of carbon dioxide is settled.

Thereafter, the pressure on the feed side is set to 0.2 MPa, and the feed gas is changed to each evaluation gas. The gases evaluated are carbon dioxide, methane, hydrogen, and nitrogen. At this time, the differential pressure between the feed gas 7 side and the permeated gas 8 side of the porous support-zeolite membrane composite 1 is about 0.1 MPa.

The permeance of carbon dioxide at 50° C. shows a high value of about $2.0 \times 10^{-6}$ [mol/(m²·s·Pa)]. In the case of hydrogen, a high value of about $6.0 \times 10^{-7}$ [mol/(m²·s·Pa)] is obtained as well, revealing that a porous support-zeolite membrane composite with a high permeance is obtained. The ideal separation coefficient α at 50° C. of carbon dioxide and methane is about 200.

Comparative Example 1

A porous support-CHA-type zeolite membrane composite was manufactured by directly thermally synthesizing CHA-type aminosilicate zeolite without attaching an inorganic particle onto the porous support.

A reaction mixture for hydrothermal synthesis was prepared as follows.

To 1.4 g of an aqueous 1 mol/L-NaOH solution and 5.8 g of an aqueous 1 mol/L-KOH solution, 0.195 g of aluminum hydroxide (containing 53.5% by mass of $Al_2O_3$, produced by Aldrich) was added and dissolved with stirring, and 114 g of desalted water was further added and stirred to provide a transparent solution. Thereto, 2.4 g of an aqueous N,N,N-trimethyl-1-adamantanammonium hydroxide (hereinafter, referred to as "TMADAOH") solution (containing 25% by mass of TMADAOH, produced by SACHEM Inc.) was added as an organic template, and 110.8 g of colloidal silica (Snowtex-40, produced by Nissan Chemicals Industries, Ltd.) was added and stirred for 30 minutes to prepare an aqueous reaction mixture.

The composition (molar ratio) this reaction mixture was $SiO_2/Al_2O_3/NaOH/KOH/H_2O/TMADAOH=1/0.067/0.15/0.1/100/0.04$ and $SiO_2/Al_2O_3=15$.

As the porous support, a porous alumina tube (produced by Noritake Co., Ltd., outer diameter: 12 mm, inner diameter: 9 mm, average pore size: 1.3 µm) was cut into a length of 80 mm, washed with desalted water, dried and then used.

As the seed crystal, CHA-type zeolite obtained by the same method as in Example 1 was used. The support above was dipped for a predetermined time in a dispersion liquid obtained by dispersing the seed crystal in 0.3% by mass of water to attach the seed crystal by a dip method and dried at 140° C. for 1 hour or more, whereby the seed crystal was attached. The increase in mass after drying was 0.70 g/m².

A porous support-zeolite membrane composite was obtained by the same method as in Example 1 from the support attached with the seed crystal and the aqueous reaction mixture prepared above.

The mass of the CHA-type zeolite crystallized on the support was determined from the difference between the mass of the porous support-zeolite membrane composite after calcination and the mass of the porous support and found to be 130 g/m².

From the image in 1 visual field obtained by SEM observation of a smooth surface created by cutting out an arbitrary part of the cross-section and polishing it with a cross-section polisher, the weighted average of the distance between the porous support surface and the zeolite membrane having penetrated toward the inside from the porous support surface was measured and found to be 5.9 µm. This value reveals greater penetration of the zeolite membrane into the support.

In addition, although a void present in the zeolite membrane was observed in 1 visual field of a cross-sectional SEM image, the presence of a void could not be confirmed.

A porous support-CHA-type zeolite membrane composite manufactured under the same conditions as above except for changing the length of the support to 400 mm was cut into 80 mm, and the same single-component gas permeation test as in Example 1 was performed except for changing the pretreatment temperature to 140° C. The obtained permeance of each gas is shown in Table 3. The permeance of carbon dioxide at 50° C. was 7.2×10$^{-7}$ [mol/(m$^2$·s·Pa)], and the permeance of hydrogen was 2.6×10$^{-7}$ [mol/(m$^2$·s·Pa)]. It was found that the permeance is low compared with Examples 1 and 2. The ideal separation coefficient α at 50° C. of carbon dioxide and methane was 101.

TABLE 3

| Gas | Permeance (mol/m$^2$sPa) |
|---|---|
| CO$_2$ | 7.2 × 10$^{-7}$ |
| H$_2$ | 2.6 × 10$^{-7}$ |
| N$_2$ | 5.1 × 10$^{-8}$ |
| CH$_4$ | 7.1 × 10$^{-9}$ |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2014-237841) filed on Nov. 25, 2014, the contents of which are incorporated herein by way of reference.

DESCRIPTION OF REFERENCE NUMERALS AND SIGNS

1. Porous support-zeolite membrane composite
2. Pressure-resistant container
3. End pin
4. Connection part
5. Pressure gauge
6. Back pressure valve
7. Feed gas (feed gas)
8. Permeated gas (permeate gas)
9. Sweep gas
10. Discharge gas
11. Pipe
12. Pipe
20. Porous support-zeolite membrane composite
21. Tubular porous support
22. Zeolite membrane

The invention claimed is:

1. A separation or concentration method of a gas mixture, comprising:
   bringing a gas mixture into contact with a porous support-zeolite membrane composite, the gas mixture comprising a high-permeability component and a low-permeability component which is less permeable to the porous support-zeolite membrane composite than the high-permeability component; and
   separating by permeation the high-permeability component from the gas mixture, or concentrating the low-permeability component by permeation and separation of the high-permeability component,
   wherein the porous support-zeolite membrane composite comprises:
   a porous support; and
   a zeolite membrane formed on the porous support,
   wherein:
   part of the zeolite membrane penetrates into the inside of the porous support;
   the distance from the surface of the porous support to the inside into which the zeolite membrane penetrates is 5.0 μm or less on average;
   a zeolite constituting the zeolite membrane comprises Si and Al, and has the SiO$_2$/Al$_2$O$_3$ molar ratio of 20 or more; and
   the zeolite has a pore structure of not more than oxygen 8 members ring.

2. The separation or concentration method according to claim 1, wherein the SiO$_2$/Al$_2$O$_3$ molar ratio of the zeolite membrane is 2,000 or less.

3. The separation or concentration method according to claim 1, wherein the average pore size of the porous support is 0.3 μm or more.

4. The separation or concentration method according to claim 1, wherein the pore structure of zeolite constituting the zeolite membrane is CHA.

5. The separation or concentration method according to claim 1, wherein the distance from the surface of the porous support to the inside into which the zeolite membrane penetrates is from 0.03 to 1.7 μm on average.

6. The separation or concentration method according to claim 1, wherein the porous support-zeolite membrane composite further comprises inorganic particles other than zeolite attached to the porous support.

7. The separation or concentration method according to claim 6, wherein the inorganic particles are silica particles.

* * * * *